United States Patent Office 3,444,390
Patented May 13, 1969

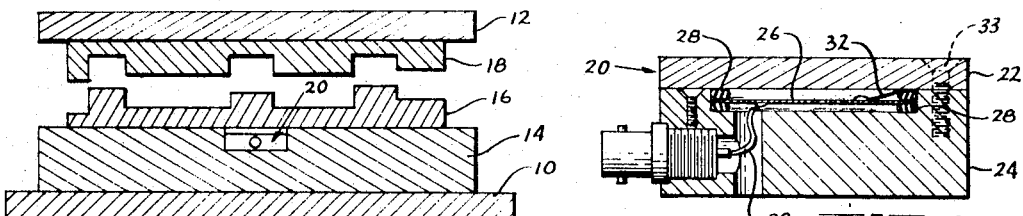
May 13, 1969     V. S. BREIDENBACH ET AL     3,444,390
PRESS IMPACT SENSOR
Filed Jan. 12, 1968
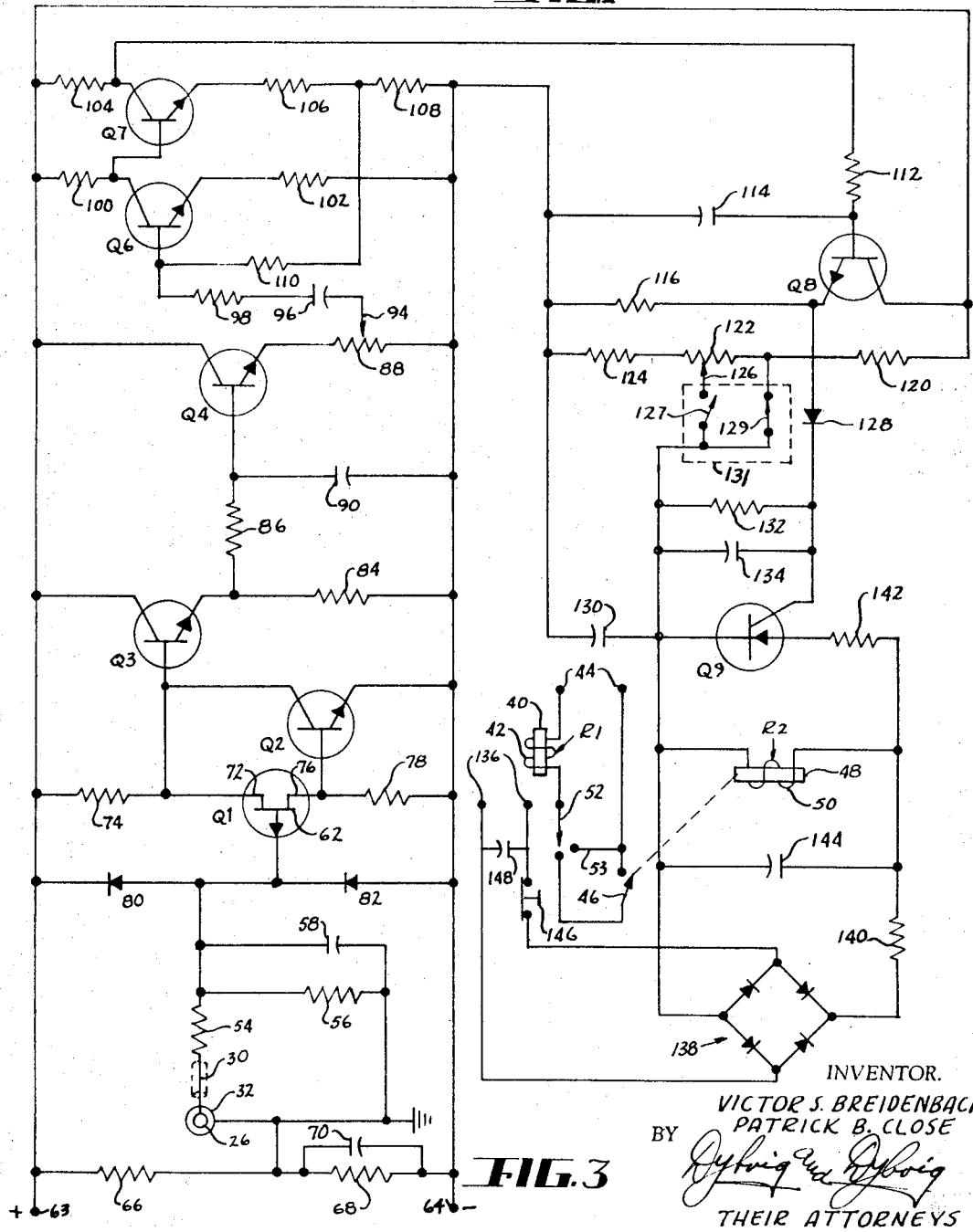
INVENTOR.
VICTOR S. BREIDENBACH
PATRICK B. CLOSE
BY
THEIR ATTORNEYS

3,444,390
PRESS IMPACT SENSOR
Victor S. Breidenbach and Patrick B. Close, Dayton, Ohio, assignors to Hyde Park Electronics, Inc., Dayton, Ohio, a corporation of Ohio
Filed Jan. 12, 1968, Ser. No. 697,496
Int. Cl. H01h 35/14
U.S. Cl. 307—116
13 Claims

ABSTRACT OF THE DISCLOSURE

The operation of the tooling used in a press is continuously monitored using a piezoelectric transducer so mounted as to receive successive accelerating disturbances produced by operation of the tooling. The piezoelectric transducer has a resonant frequency of its own and during current and voltage amplification of the signal produced by the transducer, the signal is repeatedly filtered to suppress the resonant frequency signal of the transducer, retaining only low frequency signals produced by the transduced in response to operation of the press tooling. The transducer output is calibrated to an operating condition known to be proper. A sensing circuit actuated only by a signal larger than those encountered upon calibrating the signal output during proper operation de-energizes a control relay which, when the tooling is operating properly, restrains a press shut-off mechanism.

---

This invention relates to apparatus for detecting an irregular operation of the tooling in a press and, more particularly, to electrical circuitry for filtering and amplifying the output of a piezoelectric transducer mounted to the press and for stopping the press upon the receipt of abnormally high voltage signals from the transducer; however, the invention is not necessarily so limited.

It is known to employ piezoelectric transducers in monitoring the acceleration of parts exposed to shock forces. In simplest form, the transducer element is employed only to detect the occurrence of a shock. In more elaborate applications, the transducer is employed to measure the magnitude of the accelerations resulting from shock forces. In general however, such applications for piezoelectric transducers have been restricted to comparatively simple shock conditions due to a confusion of signals which results when the nature of shock forces becomes complex. An environment in which the signal confusion is particularly evident is found in presses in which the press tooling is caused to perform multiple functions, such as cutting and drawing, all in one stroke.

The confusion of piezoelectric transducer signals results in part from the fact that the piezoelectric element, which is a relatively stiff body, has itself at least one mode of resonant vibration. When the piezoelectric element is so mounted as not to entirely damp its own resonant frequency, a single sharp acceleration or impact applied to the piezoelectric element initiates a gradually decaying sequence of vibratory flexures of the piezoelectric element at its resonant frequency. These flexures are monitored as alternating voltage signals which arrive in exponentially decaying amplitude envelopes.

If a second impact is received before the flexures produced by the first impact have decayed to a negligible level, the alternating voltage signals are continued, but at a different amplitude representing some contribution from each impact. At any given instant then, the signal amplitude produced by the piezoelectric transducer is not necessarily indicative of an accelerative force received at that same instant. Rather, it may be the resultant of a number of successive impacts received over a period of time. Ordinarily this resultant amplitude will have no useful meaning unless the recent impact history of the piezoelectric element can be known and investigated.

With the present invention, this need for an investigation of the recent history of the piezoelectric element is avoided in monitoring press tooling by establishing the peak voltage amplitudes encountered during normal press operation and thereafter monitoring only for voltage amplitudes which exceed those known to be present during a proper tooling operation. Initial attempts to monitor press tooling in this fashion disclosed that the raw voltage signals developed by the piezoelectric element had little or no correlation to the operation of the press tooling. However, it was discovered that by first filtering the raw piezoelectric signal to suppress the resonant signal frequency of the piezoelectric element and retain only the low frequency amplitude variations, the resultant low frequency signal reliably reflected the operating condition of the press tooling.

Thus, the monitoring of the properly filtered piezoelectric signal was found very effective for the purpose of promptly detecting an irregular operation of press tooling. The practice of this technique was also found to require only simple and inexpensive filter components to remove the resonant piezoelectric frequency since it was unnecessary to specifically eliminate the resonant frequency of the piezoelectric element with the use of tuned circuits and the like. Thus, the technique of the present invention allows the use of comparatively inexpensive electronic equipment for the seemingly complex task of monitoring the operation of the tooling or dies in a press.

An object of the present invention is to provide a new and improved method for monitoring the operation of the tooling in a press.

Another object of the present invention is to provide new and improved circuitry for filtering and amplifying signals produced by piezoelectric elements.

Another object of the present invention is to provide new and improved circuitry for detecting abnormally large voltage signals produced by a piezoelectric element and, in response to such signals, initiate correction or shut-down of a press.

Other objects and advantages reside in the construction of parts, the combination thereof, the method of manufacture and the mode of operation, as will become more apparent from the following description.

In the drawing, FIGURE 1 is a schematic elevational view of a press structure embodying the present invention.

FIGURE 2 is an enlarged sectional view of a piezoelectric transducer mounted in the press of FIGURE 1.

FIGURE 3 is a schematic circuit diagram illustrating a circuit for monitoring the operation of the piezoelectric transducer of FIGURE 2.

Referring to the drawing in greater detail, FIGURE 1 depicts elements of a conventional press assembly in which the press has a fixed platen 10 and a movable platen or ram 12. Mounted on the platen 10 is a conventional bolster plate 14 which supports a lower die 16. The die 16 may have any of a number of shapes.

A complementary die 18 is supported by the ram 12. The dies 16 and 18 are sometimes hereinafter referred to as the tooling for the press.

In a typical operation involving sheet metal, the die 18, when moved toward the die 16, will cooperate with the die 16 to sever a portion of the sheet metal placed between the dies, then draw the metal to a desired shape.

The piece severed from the stock and formed or drawn as the ram moves downwardly is next removed from the dies by any of various devices, some of which operate as the ram moves upwardly, then new stock is advanced into the press before the ram again moves downwardly. Mechanisms for accomplishing these functions are well known and therefore not illustrated in the drawings.

To sense certain irregularities of the press operation, such as a failure to eject a previously formed piece, or an incorrect stock condition, a piezoelectric transducer 20 is fixedly mounted in the bolster plate 14. The interior of the bolster plate is selected as the mounting situs for the transducer 20 since this location is found to give the transducer optimum sensivity to vibrations generated by operation of the dies.

A desirable mounting for the piezoelectric transducer is illustrated in FIGURE 2. This mounting comprises a two piece housing having an upper cover portion 22 and a lower receptacle portion 24. Mounted within the housing is a ceramic piezoelectric disc 26 sandwiched between resilient O-rings 28. The lower surface of the disc 26 is contacted by a shielded conductor 30. The upper surface of the disc 26 is grounded to the housing by means of conductor 32.

During assembly, screws 33 draw the cover portion toward the receptacle portion to compress the O-rings against the piezoelectric disc and thereby resiliently mount the disc in the housing. The receptacle portion 24 is securely bolted to the bolster plate 14.

The mounting for the piezoelectric disc 26 is such that vibrations or shocks received by the bolster plate 14 accelerate the housing portions 22 and 24 relative to the piezoelectric disc 26, causing the O-rings 28 to abruptly accelerate the margins of the disc 26. The inertia of the central part of the disc 26 causes flexure of the disc as the margin in accelerated, thus causing the central portion of the disc 26 to vibrate. The disc 26 is quite stiff and therefore vibrates with a high resonant frequency in recovering from flexure. The O-rings provide a mounting frequency which is low compared to the resonant frequency of the disc so that resonant vibration of the disc 26, while restricted by the O-rings 28, is not entirely damped.

The vibrations of the disc 26 produce high impedance voltage signals between the conductors 30 and 32. In the practice of the present invention these high impedance voltage signals, which involve only a very small current, are rendered amenable to detection and measurement with conventional electronic circuitry by reducing the signal impedance, amplifying the signal current and then amplifying the signal voltage. Circuitry for accomplishing these functions is illustrated in FIGURE 3.

Presses typically have accompanying control elements which enable a quick shut-down when an irregular operation occurs. Frequently the control elements include a mechanical brake biased to stop the press and a shut-off relay which disables or restrains the mechanical brake during regular press operation. Thus, on power failure or the occurrence of a deliberate act to stop the press, the shut-off relay can be quickly de-energized to permit the brake to operate.

For purposes of illustration only, the present invention is described with reference to a shut-off relay, such as above described. Those skilled in the art will immediately recognize of course that the shut-off relay offers merely one of many devices by which a press may be stopped or its operation corrected with the circuitry of the present invention in response to detection of a press irregularity.

In FIGURE 3 the press shut-off relay is represented schematically at R1 by an armature 40 encircled by a coil 42. The coil 42 is energized from an alternating current source 44 through a normally open interrupter switch 46. The normally open switch 46 is normally held closed by a second relay R2 comprising an armature 48 and coil 50.

Since the switch 46 is a normally open switch, the press shut-off relay R1 cannot be energized to permit press operation until the relay R2 has been energized. As will be more fully explained in the following, relay R2 remains continuously energized when the detector circuitry of FIGURE 3 senses proper press operation but is de-energized as soon as an improper press operation is sensed. Thus, during proper press operation, relay R2 holds switch 46 closed so that relay R1 will disable the press shut-down mechanism.

At certain times, such as during press set-up, the press operator will desire to override the detector circuitry of FIGURE 3. This override condition can be accomplished by means of the switch 52 which, when connected to conductor 53, energizes relay R1 to permit press operation even though switch 46 may remain open.

As the press is operating, a voltage signal between ground and the conductor 30 is generated by the piezoelectric disc 26. This voltage signal alternates basically at the resonant frequency for the piezoelectric disc 26 with amplitudes varying at a lower frequency determined principally by operation of the press tooling. The voltage signal is passed through a resistor 54 to the gate 62 of a P-channel, depletion mode field effect transistor Q1. To suppress the resonant frequency characteristics of the signal in relation to the lower frequency amplitude variations, the signal is paritally filtered before it reaches the gate 62 by means of a resistor 56 and capacitor 58 which form a parallel circuit to ground and cooperate with resistor 54 to provide a low pass filter.

Bias for the field effect transistor Q1 is received at the positive and negative terminals, 63 and 64 respectively, from a direct current voltage source, not shown. This same source also supplies the power requirements of succeeding amplifier stages. For biasing the transistor Q1, the supply voltage is applied to a voltage divider comprising resistors 66 and 68. The voltage divider is grounded between the resistors 66 and 68 and this center ground is coupled to the negative side of the direct current voltage source through capacitor 70.

The source 72 for the field effect transistor is connected to the positive end of the voltage divided through resistor 74 and the drain 76 of the field effect transistor is connected to the negative end of the voltage divider through resistor 78.

Due to the center grounding of the voltage divider, the grounding of one face of the piezoelectric disc 26 and the described bias on the field effect transistor Q1, the voltage signal generated by the piezoelectric disc drives the gate 62 of the field effect transistor alternatively negatively and positively with respect to ground. The voltage signal applied to the gate 62 is confined within useful limits by the clamping diodes 80 and 82.

Those skilled in the art will recognize that other three terminal active devices may be substituted for the specific field effect device described. However, a depletion mode field effect device is preferred because of its high input impedance.

The field effect transistor Q1 is coupled to an n-p-n transistor Q2 to produce a unipolar-bipolar cascade amplifier. The unipolar-bipolar cascade is employed in the present circuit as a device to couple the high impedance piezoelectric source to low impedance signal amplification and detection circuitry which follows.

The unipolar-bipolar cascade is established by connecting the resistor 78 in the emitter-base circuit of transistor Q2, whereby the transistor Q2 operates as a drain follower, and conecting the collector of Q2 to the source of the field effect transistor.

The ouput of the unipolar-bipolar cascade is fed to the base of transistor Q3. Transistor Q3 has its collector connected to the positive side of the supply voltage and its emitter connected through resistor 84 to the negative side of the supply voltage with the result that the signal now appears as a relatively low impedance signal across the resistor 84.

Transistor Q4 is coupled to transistor Q3 in an emitter-follower relation to provide current amplification of the signal appearing across resistor 84. Thus, the base of Q4 is connected to the emitter of Q3 through a coupling resistor 86 while the collector of Q4 is directly connected to the positive side of the supply voltage and the emitter connected to the negative side of the supply voltage through resistor 88. Capacitor 90 connected in parallel between the base of transistor Q4 and the negative side of the voltage supply cooperates with resistor 86 to provide a second low pass filter for attenuating the high frequency signals produced by piezoelectric disc 26. The output of the foregoing current amplifier stages appears across resistor 88 and has received sufficient current amplification that voltage amplification with conventional transistor elements is now possible.

The signal appearing across resistor 88 is removed through an adjustable tap 95 on the resistor 88 for application through a coupling capacitor 96 and resistor 98 to the base of transistor Q6. Transistor Q6 has its collector connected to the positive side of the supply voltage through resistor 100 and its emitter connected to the negative side of the supply voltage through resistor 102.

The collector voltage of transistor Q6 is applied to the base of transistor Q7 which has its collector connected to the positive side of the supply voltage through resistor 104 and has its emitter connected to the negative side of the supply voltage through resistors 106 and 108. Resistor 110 is connected between the base of transistor Q6 and the emitter of transistor Q7 at a point between the resistors 106 and 108 to provide a negative feed back loop to stabilize and reduce distortion of the signal. Transistors Q6 and Q7, connected as described, provide a two stage low frequency amplifier for the signal taken from resistor 88. The amplified signal appearing on the collector of Q7 is filtered for the third time with a low pass filter comprising resistor 112 and capacitor 114 which are connected in series between the negative side of the supply voltage and the collector of transistor Q7.

The output signal from the preceding two stage amplifier is coupled to the base of transistor Q8 through resistor 112. Transistor Q8 has its collector directly connected to the positive side of the supply voltage and its emitter connected to the negative side of the supply voltage through resistor 116. Q8 converts the signal resulting from voltage amplification to a low impedance signal appearing across resistor 116.

Since the high frequency portion of the signal generated by the piezoelectric disc 26 has now been suppressed by three successive low pass filters, the signal appearing across resistor 116 comprises, esentially, only the low frequency amplitude variation produced by operation of the press dies. The remaining portions of the circuit of FIGURE 3 to be described comprise circuitry to detect voltage peaks in the low frequency signal developed across the resistor 116 and to take an appropriate action to stop the press when the signal voltage across the resistor 116 indicates an improper press operation.

Detection of such voltage peaks is accomplished through the use of a silicon controlled rectifier Q9 which, as will be explained, compares the voltage developed across resistor 116 with a preset voltage reference and triggers a press shut-down only when a signal appears across resistor 116 which exceeds the voltage reference by a voltage sufficient to gate the controlled rectifier.

To achieve this function, a voltage divider comprising the resistors 120, 122 and 124 is established across the supply voltage. An adjustable tap 126 on resistor 122 provides an adjustable voltage reference to the cathode of the controlled rectifier Q9. The reference voltage is applied to the cathode of Q9 through a switch 127, which, as will be described, is a normally open switch held closed, while a companion switch 129 is held open, during ordinary circuit operation by a relay. Thus, during ordinary press operation, the reference voltage is at all times applied to the cathode of Q9.

The voltage developed across the resistor 116 is applied to the gate of Q9 through diode 128. The signal developed across resistor 116 is thus seen by the gate and cathode of Q9 as the difference between the voltage developed across resistor 116 and the reference voltage selected by the tap 126 on resistor 122.

Resistor 132 is a bias resistor for the controlled rectifier and also cooperates with parallel connected capacitor 134 to prevent an accidental gating of the controlled rectifier by transients arising in the direct current voltage supply. Capacitor 134 also provides additional low pass filtering.

The power to be controlled or gated by the controlled rectifier is derived from an external alternating current supply 136 applied to a full wave rectifier 138. One side of the output from the rectifier 138 is applied directly to the cathode of the controlled rectifier and coupled to the negative side of the amplifier voltage supply through capacitor 130. The opposite side is applied to the anode of the controlled rectifier through resistors 140 and 142. The previously described relay R2 is connected across the output of the rectifier 138. Thus, the relay R2 is normally energized from the output of the rectifier 138, but is de-energized by gating of the controlled rectifier Q9 which then shunts relay R2. The presence of capacitor 144 across the output of the rectifier 138 prevents the controlled rectifier Q9 from being automatically reset as the voltage output of the full wave rectifier 138 periodically drops to zero. Thus, the controlled rectifier Q9, once gated, remains gated until restored to a nonconductive state by an interruption of the alternating current power supply.

In the present circuit, resetting of the controlled rectifier is accomplished by means of a push-button reset switch 146. Switch 146 is biased in conventional fashion to a normally closed condition and is manually opened to reset the controlled rectifier. Capacitor 148 across the alternating current power supply is provided to reduce arcing at the contacts of the reset switch 146.

The circuit of FIGURE 3 is operated as follows. With the press which is to be monitored performing properly in the intended fashion, the tap 126 on resistor 122 is set to a central position on resistor 122 so as to set the reference voltage to which the amplified signals received from the piezoelectric disc 26 are compared to a medium level. The tap 94 on resistor 98 is then adjusted to establish a signal level supplied to the two stage voltage amplifier which is sufficient to cause gating of the controlled rectifier Q9 even when the press is normally operating. After this preliminary adjustment of the tap 94, the tap 94 is moved downwardly an arbitrary but small distance to reduce the signal strength passed to the voltage amplifier to a level at which controlled rectifier Q9 will not be gated during normal operation of the press. This adjustment of the tap 94 sets the input to the voltage amplifier stages to a level at which these amplifier stages will not be overdriven.

After the signal strength has thus been set approximately to that required to gate the controlled rectifier Q9, the tap 126 to the resistor 122 is adjusted to decrease the positive bias to the cathode of Q9 until normal press operation once again gates Q9. This positive bias adjustment constitutes a fine adjust in the sensivity of the gate of Q9 to the amplifier output. After the tap 126 has been adjusted to a level at which normal press operation gates Q9, the tap is adjusted a small but arbitrary distance toward the positive side of the amplifier voltage supply so that normal press operation will not gate Q9, but a small increase to the voltage signals received from the piezoelectric disc 26 will gate Q9.

In certain types of presses, an example being strip feed presses, it is necessary to change or replenish the stock being fed the press. Following such changes, the press may be cycled a limited number of times with no stock between the dies. The operation of the dies without stock to work against substantially alters the vibrations impressed upon the piezoelectric disc 26 with the result that the controlled rectifier Q9 may be gated following start-up after stock replenishment, at a time when a press shut-down is not desired. To prevent gating of Q9 during such foreseeable intervals of irregular press operation, a conventional time delay relay circuit, not shown, which has a separate power source may be used to control the previously described relay switch 127 as well as a companion relay switch 129. These switches are grouped together in a box 131 to indicate that the switches both respond to the same electromagnetic control.

In a recommended time delay operation, after press stoppage to replenish stock, the press is turned on to advance the stock to the dies and simultaneously the time delay circuit energized. During the period of stock advance, when the dies are not operating against the stock, the time delay relay remains de-energized so that the switch 127 is open and the switch 129 is closed. This provides a substantially increased positive bias on the cathode of Q9 which prevents gating of Q9 during the time the new stock strip is being advanced to a position between the dies. After a predetermined time delay sufficient to advance the new stock to the dies, the time delay relay is energized to close switch 127 and to open switch 129 and to hold these switch positions throughout continued press operation. This restores the cathode of Q9 to the bias level previously established by the setting of the tap 126 on resistor 122.

After the position of the tap 126 on register 122 has been set in the manner described, Q9 will not be gated except upon generation of abnormally large low frequency voltage signals by the piezoelectric disc 26. When the press is operating properly, such signals will not be generated. When an improper press operation occurs however, such as by failure of the press dies to eject a part formed therebetween, the extra metal between the dies will cause an increased impact sensed by the piezoelectric disc 26 and generate a signal sufficient to gate Q9. When Q9 is gated, relay R2 is shunted by Q9 with the result that the coil 50 discharges. Discharge of the coil 50 releases normally open relay switch 46, thus collapsing the field about coil 42 of relay R1. As described, the relay R1 may be used to control or restrain a press shut-off mechnism so that when relay R1 de-energizes the shut-off mechanism operates.

Those skilled in the art will recognize that the operation of a press shut-off mechanism by relay R1 is merely one mode of applying the present invention. Thus, the relay R1 may initiate any of a number of corrective actions of which releasing a shut-off mechanism is only an example. As other examples, the relay R1 may initiate mechanism to eject a defective part from between the dies or to correct a defect in the feeding of stock between the dies.

One of the very important benefits from the present invention resides in the fact that the circuitry of FIGURE 3 is adjustable to meet the operating conditions of any press tooling to be monitored irrespective of press capacity. Thus, a single circuit assembly with accompanying transducer may be adapted to any press which is to be monitored and changed from press to press as may be desired. In moving the transducer from one press to another or in moving the transducer from one position to another position in a single press, the only adjustments required to adapt the sensing assembly to its new operating condition are the previously described adjustments of the taps 94 and 126. Thus, the present invention provides a general purpose impact sensing device which need not be designed to any particular press operating condition.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described our invention, we claim:

1. In combination with a press having a control mechanism the operating condition of which is governed by a first relay having a first coil energized from a source of power therefor; a normally open interrupter switch in series with the coil of said first relay and its power source, a second relay including a second coil to close said interrupter switch, a source of direct current power to operate said second relay connected in series with said second coil, said direct current source normally energizing said second relay to hold said interrupter switch closed, a controlled rectifier having anode, cathode and gate elements, circuit means connecting said anode and cathode elements across the coil of said second relay, said controlled rectifier having a polarity opposing the current from said direct current source except when triggered to conductivity by an application of sufficient voltage to said gate element, and means responsive to accelerations generated by an operating condition of said press to apply a sufficient voltage to said gate element, said controlled rectifier upon receiving said sufficient voltage at said gate element shorting the coil of said second relay thereby releasing said normally open interrupter switch to de-energize said first relay and thereby change the operating condition of said control mechanism.

2. The combination of claim 1 in which said means responsive to accelerations generated by an operating condition of said press comprises a piezoelectric transducer having two terminals, means mounting said transducer to a part of said press, and means responsive to voltage signals developed by said transducer between said terminals to apply voltage to said gate element.

3. The combination of claim 2 in which said means responsive to voltage signals developed by said transducer includes a high impedance field effect transistor having source, second gate and drain elements, a second source of direct current voltage, means connecting said second voltage source across said source and drain elements, a voltage divider across said second voltage source having a central connection to one terminal of said transducer, means connecting the other terminal of said transducer to said second gate element, and amplifier means responsive to the voltage difference between said drain element and said second gate element to apply a corresponding voltage across the gate and cathode elements of said controlled rectifier.

4. The combination according to claim 3 including means to apply a part of the voltage of said second voltage source to the cathode element of said controlled rectifier.

5. The combination according to claim 3 wherein said amplifier means includes a plurality of low pass filters to successively attenuate high frequency voltage signals developed by said transducer.

6. The combination of claim 1 wherein said means to apply a sufficient voltage to said gate element includes a second source of direct current voltage, said combination including means applying a part of the voltage of said second direct current voltage source to said cethode element.

7. The combination of claim 6 wherein said means applying a part of the voltage of said second voltage source to said cathode element includes a voltage divider across said second voltage source, an adjustable tap to said voltage divider, and conductor means connecting said tap to said cathode element.

8. Apparatus to monitor the operation of the tooling in a press having relatively movable members supporting said tooling, said apparatus comprising: a piezoelectric transducer, means mounting said transducer to one of said members, said transducer having first and second terminals, means connecting said first terminal to ground, a field effect device having source, gate and drain elements, a source of direct current voltage grounded at an intermediate voltage level, first circuit means including a drain resistance connecting said source and drain elements across said voltage source, second circuit means connecting said second terminal to said gate element, said second circuit means including a low frequency pass filter, current amplifier means connected across said drain resistance, a second resistance across the output of said current amplifier means, voltage amplifier means coupled across said second resistance, said voltage amplifier means including a low frequency pass filter, a third resistance across the output of said voltage amplifier means, and means responsive to a voltage drop of predetermined magnitude in said third resistance to alter the operation of said press.

9. Apparatus to monitor the operation of the tooling in a press having relatively movable members supporting said tooling, said apparatus comprising a piezoelectric element having a mode of resonant vibration, means engaging said piezoelectric element to mount said piezoelectric element to one of said members, amplifier means receiving voltage signals developed by said piezoelectric element to modify the current and voltage characteristics of said signals, said amplifier means including filter means to attenuate said resonant frequency of said piezoelectric element, and means connected across the output of said amplifier and responsive to a voltage signal of predetermined magnitude received from said amplifier to control said press.

10. The apparatus of claim 9 wherein said means to mount said piezoelectric element comprises a bolster plate fixedly attached to said one member and securing a portion of said tooling to said one member, said bolster plate having a cavity therein adjacent said portion of said tooling, and resilient means mounting said piezoelectric element in said cavity.

11. The apparatus of claim 9 wherein said means connected across the output of said amplifier includes resistance means across the output of said amplifier, a controlled rectifier having anode, cathode and gate elements, third circuit means connecting said resistance means between said cathode and gate elements, relay means effective to control and operating condition of said press, a source of voltage in series with and effective to operate said relay means, and means connecting the anode and cathode elements of said controlled rectifier in parallel with said relay means.

12. Apparatus to monitor the operation of the tooling in a press having relatively movable members supporting said tooling, said apparatus comprising: a piezoelectric transducer, means mounting said transducer to one of said members, said transducer having first and second terminals, means connecting said first terminal to ground, an active device having third, fourth and fifth terminals, a source of direct current voltage grounded at an intermediate voltage level, first circuit means connecting said third and fourth terminals across said voltage source, second circuit means connecting said second terminals to said fifth terminal, and means to change the operation of said press in response to a preselected voltage difference between said fourth and fifth terminals.

13. In the method of monitorizing the operation of the dies in a press by means of a piezoelectric transducer mounted adjacent one of said dies and by means filtering and adjustably amplifying the signal output of said transducer so as to substantially eliminate high frequency signals while retaining low frequency signals produced by said transducer; the steps of operating said press, applying said retained signals to a voltage detector, adjusting the amplification of said amplifying means while said press operates to a level triggering said voltage detector, and reducing the amplification of said retained signals to a level below that required to trigger said voltage detector, whereby said detector will thereafter be triggered only by retained voltages exceeding those encountered by the detector when the amplifier was adjusted.

References Cited

UNITED STATES PATENTS

| | | | |
|---|---|---|---|
| 3,350,582 | 10/1967 | Attwood et al. | 310—8.1 |
| 3,356,868 | 12/1967 | Cother | 310—8.1 X |
| 3,400,284 | 9/1968 | Elazar | 310—8.1 X |

ROBERT K. SCHAEFER, *Primary Examiner.*

T. B. JOIKE, *Assistant Examiner.*

U.S. Cl. X.R.

72—4, 31; 310—8.1

PO-1050
(5/69)

UNITED STATES PATENT OFFICE
CERTIFICATE OF CORRECTION

Patent No. 3,444,390          Dated  May 13, 1969

Inventor(s) Victor S. Breidenbach and Patrick B. Close

It is certified that error appears in the above-identified patent and that said Letters Patent are hereby corrected as shown below:

Column 1, line 21, "transduced" should read --transducer--.
Column 4, line 41, "divided" should read --divider--; line 68, "conecting" should read --connecting--.
Column 5, line 14, insert --the-- before "piezoelectric"; line 20, "tap 95" should read --tap 94--; line 53, "esentially" should read --essentially--; line 54, "variations" should read --variation--.
Column 7, line 35, "register 122" should read --resistor 122--; line 61, insert --resulting-- before "from".
Column 8, line 70, "cethode" should read --cathode--.
Column 10, line 3, "and" should read --an--; line 18, "terminals" should read --terminal--; line 22, "monitorizing" should read --monitoring--.

SIGNED AND
SEALED
MAR 17 1970

(SEAL)
Attest:

Edward M. Fletcher, Jr.
Attesting Officer

WILLIAM E. SCHUYLER, JR.
Commissioner of Patents